US011296629B2

(12) United States Patent
Guo

(10) Patent No.: US 11,296,629 B2
(45) Date of Patent: Apr. 5, 2022

(54) METHOD, DEVICE FOR SUB SYNCHRONOUS OSCILLATION SUPPRESSION AND CONTROLLER FOR CONVERTER

(71) Applicant: BEIJING GOLDWIND SCIENCE & CREATION WINDPOWER EQUIPMENT CO., LTD., Beijing (CN)

(72) Inventor: Rui Guo, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 531 days.

(21) Appl. No.: 16/342,281

(22) PCT Filed: May 14, 2018

(86) PCT No.: PCT/CN2018/086659
§ 371 (c)(1),
(2) Date: Apr. 16, 2019

(87) PCT Pub. No.: WO2019/128038
PCT Pub. Date: Jul. 4, 2019

(65) Prior Publication Data
US 2021/0359628 A1 Nov. 18, 2021

(30) Foreign Application Priority Data
Dec. 29, 2017 (CN) .......................... 201711499188.9

(51) Int. Cl.
*H02P 9/10* (2006.01)
*H02J 3/24* (2006.01)
(Continued)

(52) U.S. Cl.
CPC .............. *H02P 9/10* (2013.01); *G05B 13/041* (2013.01); *H02J 3/24* (2013.01); *H02J 3/381* (2013.01);
(Continued)

(58) Field of Classification Search
CPC .. H02P 9/10; G05B 13/041; H02J 3/24; H02J 3/381; H02J 13/00002; H02J 2300/28
See application file for complete search history.

(56) References Cited

U.S. PATENT DOCUMENTS 5,568,039 A * 10/1996 Fernandez ............. H02J 7/0036
320/150
5,949,694 A * 9/1999 Amerasekera ........ G06F 30/367
716/115

(Continued)

FOREIGN PATENT DOCUMENTS

| CN | 102282757 A | 12/2011 |
| CN | 104221241 A | 12/2014 |

(Continued)

OTHER PUBLICATIONS

International Search Report dated Sep. 13, 2018; PCT/CN2018/086659.

(Continued)

*Primary Examiner* — Ziaul Karim

(57) ABSTRACT

A subsynchronous oscillation suppression method and an apparatus and a controller of a converter are provided in the present disclosure, the controller is for controlling the converter. The method includes: acquiring an electric energy fluctuation parameter generated by a subsynchronous oscillation of a power transmission system; acquiring a compensation parameter of a current setting for an active axis according to the electric energy fluctuation parameter; controlling the converter to suppress the subsynchronous oscil- (Continued)

lation according to the compensation parameter of the current setting for the active axis.

17 Claims, 11 Drawing Sheets

(51) Int. Cl.
  *H02J 3/38* (2006.01)
  *G05B 13/04* (2006.01)
  *H02J 13/00* (2006.01)

(52) U.S. Cl.
  CPC ..... *H02J 13/00002* (2020.01); *H02J 2300/28* (2020.01)

(56) References Cited

U.S. PATENT DOCUMENTS

| | | | |
|---|---|---|---|
| 8,327,310 B1* | 12/2012 | Oliva | G06F 30/367 716/136 |
| 2011/0101689 A1* | 5/2011 | Larsen | F03D 9/255 290/44 |
| 2012/0032440 A1 | 2/2012 | Schindele et al. | |
| 2013/0176751 A1 | 7/2013 | Olea et al. | |
| 2014/0032000 A1* | 1/2014 | Chandrashekhara | H02J 3/46 700/292 |
| 2014/0232198 A1 | 8/2014 | Garcia et al. | |
| 2017/0031373 A1* | 2/2017 | Hackl | H02H 3/16 |

FOREIGN PATENT DOCUMENTS

| | | |
|---|---|---|
| CN | 104333022 A | 2/2015 |
| CN | 105703382 A | 6/2016 |
| CN | 105790288 A | 7/2016 |
| CN | 106130038 A | 11/2016 |
| CN | 106505592 A | 3/2017 |
| CN | 106786664 A | 5/2017 |
| CN | 106972509 A | 7/2017 |
| EP | 2317134 A2 | 5/2011 |
| EP | 2865889 A1 | 4/2014 |
| WO | 2010/069456 A2 | 6/2010 |
| WO | 2013/004252 A2 | 1/2013 |

OTHER PUBLICATIONS

The Extended European Search Report dated Dec. 13, 2019; Appln. No. 18865341.4.
First Chinese Office Action dated Jun. 29, 2020; Appln. No. 201711499188.9.
First Indian Office Action dated Dec. 1, 2020; Appln. No. 201917015770.

* cited by examiner

METHOD, DEVICE FOR SUB SYNCHRONOUS OSCILLATION SUPPRESSION AND CONTROLLER FOR CONVERTER

CROSS REFERENCE TO RELATED APPLICATIONS

The present application is a national phase of international application No. PCT/CN 2018/086659 filed on May 14, 2018, which claims priority to Chinese Patent Application No. 201711499188.9, titled "METHOD, DEVICE FOR SUBSYNCHRONOUS SUPPRESSION AND CONTROLLER FOR CONVERTER", filed on Dec. 29, 2017 with the Chinese Patent office, both of which are incorporated herein by reference in its entirety.

FIELD

The present disclosure relates to the technical field of power transmission, and particularly to a method, a device for subsynchronous oscillation suppression and a controller for a converter.

BACKGROUND

With the centralized and large-scale new energy power generation systems (for example, photovoltaic power generation, wind power generation and so on especially the application of full-power variable-current wind turbines) are implemented, new problems have emerged to the power grid when the large-scale grid-connected generators operate in many regions. The new grid problems mainly includes: low-order harmonics exceeds a limit; frequency fluctuations are severe, a frequency exceeding limit warning is frequently reported by monitoring equipment of a step-up substation and a stroboscopic phenomenon that can be distinguished by the human eye occurs in a fluorescent lamp for lighting in a power plant.

In a conventional grid-connected power generator, the power electronic device is usually controlled in a following manner: at a generator side, a field-oriented control based on virtual flux linkage is adopted to realize torque and weak magnetic decoupling control; at a grid side, a grid-voltage-oriented control is adopted to realize active and reactive decoupling controls. As shown in FIG. 1, three-phase currents $i_u/i_v/i_w$ at the generator side in an abc coordinate system are transformed into currents $i_\alpha/i_\beta$ in a $\alpha\beta$ coordinate system by a Clark transformation, and then the currents are transformed into currents $i_d/i_q$ on a dq axis through a Park transformation. Error currents are obtained by subtracting an actual torque current $i_q$ and an actual magnetic current $i_d$ from torque current setting $i^*_{q\_gen}$ and weak magnetic current setting $i^*_{d\_gen}$ respectively, and then said currents flow through current PI controllers (Proportional integral) to add coupling terms for the dq axis to obtain reference voltages $U^*_d$ and $U^*_q$. An inverse Park transformation and an SVPWM computation are performed thereon to obtain switching signals $S_u/S_v/S_w$ which are outputted to a rectifier power module at the generator side, so as to implement a closed loop current adjustment. The rectifier at the generator side converts AC (alternating current) power output from the generator into DC (direct current) power and supplies it into a DC bus.

Three-phase currents $i_a/i_b/i_c$ at the grid side in an abc coordinate system are transformed into currents $i_\alpha/i_\beta$ in a $\alpha\beta$ coordinate system through a Clark transformation, and then the currents are transformed into currents $i_d/i_q$ on a dq axis through a Park transformation. Error currents are obtained by subtracting the actual active current $i_d$ and the actual reactive current $i_q$ from an active current setting $i^*_d$ and a reactive current setting $i^*_q$, and then said currents flow through current PI controllers (Proportional integral) to add coupling terms for the dq axis to obtain reference voltages $E^*_q$ and $E^*_d$. An inverse Park transformation and an SVPWM computation are performed thereon to obtain switching signals $S_a/S_b/S_c$ which are outputted to an inverter power module at the grid side, so as to implement a closed loop current adjustment. The inverter at the grid side converts DC power on the DC bus into AC power and supplies it into the grid. The active current setting $i^*_d$ is an output from a voltage controller of the DC bus, that is, a difference, which is between a bus voltage setting $U^*_{dc}$ and an actual bus voltage $U_{dc}$, is processed by the PI controller to obtain the active current setting value $i^*_d$; and the reactive current setting $i^*_q$ is an output from a reactive controller, that is, a difference, which is between a reactive power setting $Q^*$ and an actual reactive power $Q_{\_grid}$, is processed by the PI controller to obtain the reactive current setting $i^*_q$.

The conventional control method can work normally under a condition of a normal voltage at the grid side. In a case that a subsynchronous oscillation may occur with an increase in the number of generators, however, a voltage fluctuation may be caused at the grid side, which may in turn cause a power fluctuation at the grid side. The Power fluctuation at the grid side then in turn cause a voltage fluctuation at a DC side. Since a supply voltage at the DC side that is processed through a bus voltage controller is used as a current setting for an active axis for controlling a power electronic device. When an actual voltage value of the DC bus fluctuates, the current setting for the active axis may also fluctuate, thus causing non-convergence of fluctuations in the power electronic device and non-suppression of the subsynchronous oscillation. Therefore, a large number of wind turbines may be disconnected from the grid, and an acting of the subsynchronous protection device of other generator units adjacent thereto may be induced accordingly when the subsynchronous oscillation occurs, since a control component of the conventional power electronic device lacks a function of suppressing the power of the subsynchronous oscillation. This may lead to generators tripping which is a serious threat to the grid security

SUMMARY

The objective of the present disclosure is to suppress a subsynchronous oscillation of a grid.

According to a first aspect of the present disclosure, a subsynchronous oscillation suppression method for controlling a converter is provided according to an embodiment of the present disclosure. The suppression method may include: acquiring an electric energy fluctuation parameter generated by a subsynchronous oscillation of a power transmission system; acquiring a compensation parameter of a current setting for an active axis according to the electric energy fluctuation parameter; and controlling the converter to suppress the subsynchronous oscillation according to the compensation parameter of the current setting for the active axis.

According to a second aspect of the present disclosure, a subsynchronous oscillation suppression device for controlling a converter is provided according to an embodiment of the present disclosure. The device includes: an acquisition module, configured to acquire an electric energy fluctuation parameter generated by a subsynchronous oscillation of a power transmission system; a compensation parameter generation module, configured to generate a compensation parameter of a current setting for an active axis according to the electric energy fluctuation parameter; and a feedback control module, configured to control the converter to suppress the subsynchronous oscillation according to the compensation parameter of the current setting for the active axis.

According to a third aspect of the present disclosure, a controller for a converter provided with the subsynchronous oscillation suppression device described above is provided in an embodiment of the present disclosure.

For the subsynchronous oscillation suppression method, device and the controller for the converter including the same according to the embodiments of the present disclosure, an electric energy fluctuation component generated by a subsynchronous oscillation of a power transmission system (such as a grid) is acquired, and a compensation parameter of a current setting for an active axis is acquired according to the electric energy fluctuation component. The converter is controlled by a switching signal, which is obtained through a series of control based on the current setting for the active axis and the actual current. Therefore, the compensation parameter of the current setting for the active axis may be obtained according to the electric energy fluctuation parameter, and the converter is controlled by performing a compensation on the current setting for the active axis, thereby suppressing the subsynchronous oscillations.

DETAILED DESCRIPTION

Figure 1:
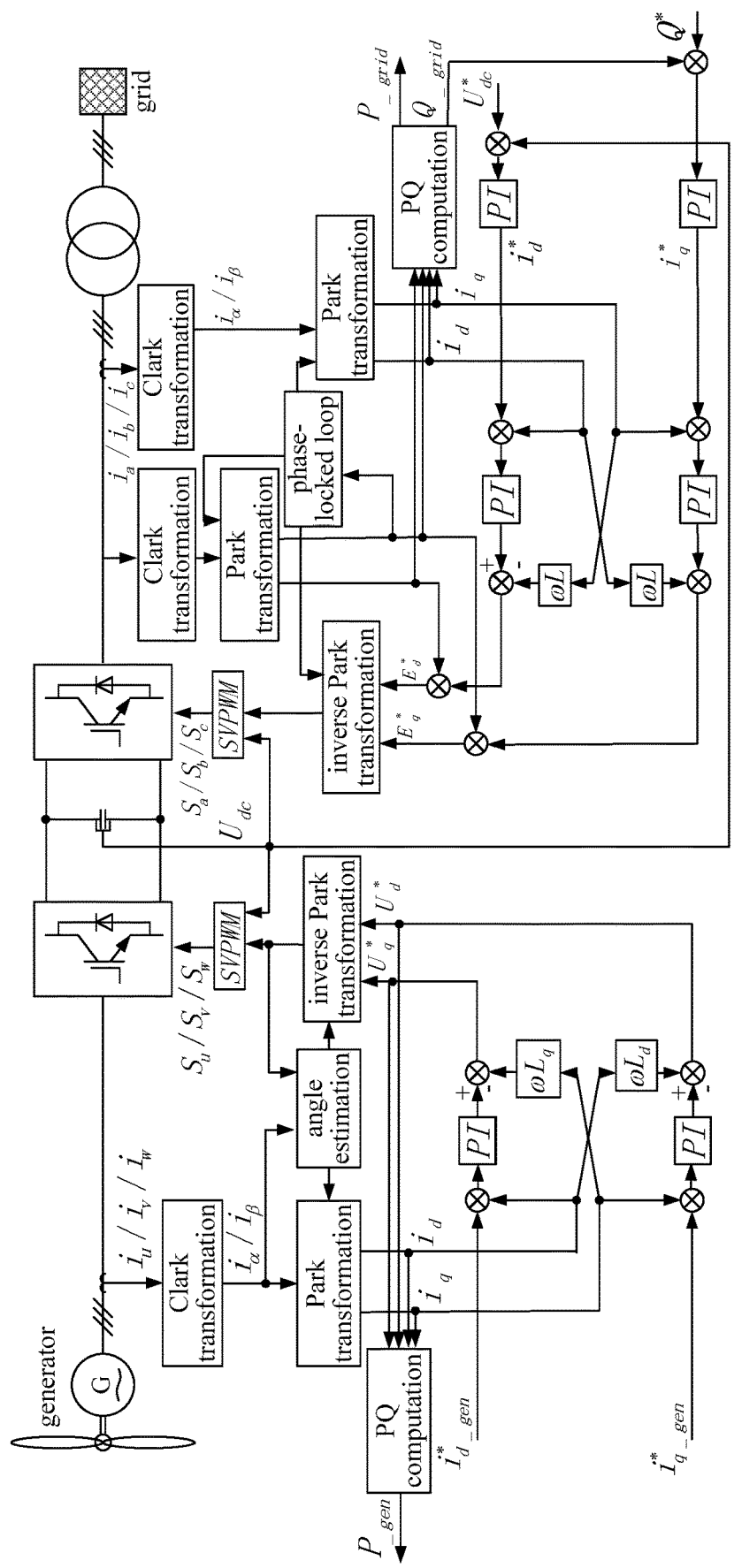
FIG. 1 is a block diagram showing controlling of a converter in the conventional art.
Figure 2:
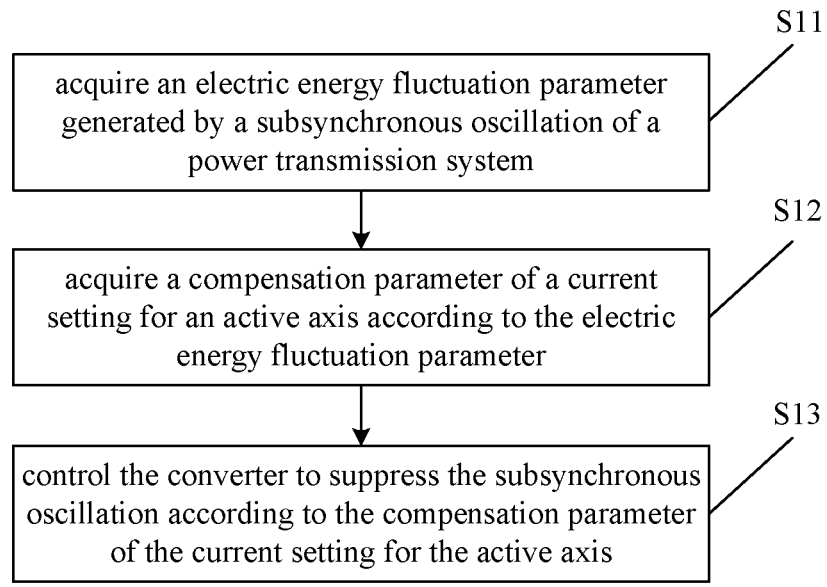
FIG. 2 is a schematic diagram showing a method for suppressing a subsynchronous oscillation according to an embodiment of the present disclosure.

Hereinafter, the technical solutions of the present disclosure will be clearly and completely described in conjunction with drawings. Apparently, the described embodiments are part, rather than all, of embodiments of the present disclosure. All other embodiments obtained by those ordinary skilled in the art based on the embodiments of the present disclosure without creative efforts are within the scope of the present disclosure.

The grid-connected power electronic devices of generators are usually controlled in a following manner: at a generator side, a field-oriented control based on virtual flux linkage is adopted to realize torque and weak magnetic decoupling controls; at a grid side, a grid-voltage-oriented control is adopted to realize active and reactive decoupling controls. Three-phase currents at the generator side are transformed into currents in a αβ coordinate system by a Clark transformation, and then the currents are transformed into a torque current and a weak magnetic current on dq axis through a Park transformation. Error currents are obtained by subtracting an actual torque current and an actual magnetic current from torque current setting and weak magnetic current setting respectively, and then said currents flows through current PI controllers (Proportional integral) to add coupling terms for the dq axis to obtain reference voltages. A Park and an SVPWM computation are performed thereon to obtain switching signals, which are outputted to a power electronic converting device, such as a rectifier, at the generator side, so as to implement a closed loop current adjustment. The rectifier at the generator side is configured to convert AC power output from the generator into DC power and supplies it into a DC bus.

Three-phase currents at the grid side is transformed into currents in a αβ coordinate system through a Clark transformation, and then the currents are transformed into an active current and a reactive current on a dq axis through a Park transformation. Error currents are obtained by subtracting the active current and the reactive current from an active current setting and a reactive current setting respectively, and then said currents flow through current PI controllers (Proportional integral) to add coupling terms for the dq axis to obtain reference voltages. A Park transformation and an SVPWM computation are performed thereon to obtain switching signals, which are outputted to an inverter power module at the grid side to implement a closed loop adjustment on current. The inverter at the grid side converts DC power on the DC bus into AC power and supplies it into the grid. The active current setting is an output from an actual voltage controller of the DC bus, that is, a difference, which is between a bus voltage setting and an actual bus voltage, is processed by the PI controller to obtain the active current setting; and the reactive current setting is an output from a reactive controller, that is, a difference, which is between a setting reactive power and an actual reactive power, is processed by the PI controller to obtain the reactive current setting.

For new energy power transmission, especially when generation from new energy source is connected to the grid in a grid-connected scale, such as a grid-connected wind power generation system or a grid-connected photovoltaic power generation system, a subsynchronous oscillation component may be generated, causing a voltage fluctuation at the grid side, which may in turn cause a power fluctuation at the grid side. The Power fluctuation at the grid side then in turn cause a voltage fluctuation at a DC side. Since a supply voltage at the DC side that is processed through a bus voltage controller is used as a current setting for an active axis for controlling a power electronic device. When an actual voltage value of the DC bus fluctuates, the current setting for the active axis may also fluctuate, thus causing non-convergence of fluctuations in the power electronic device and non-suppression of the subsynchronous oscillation. The subsynchronous oscillation suppression method according to this embodiment is to pertinently enhance a damping for the subsynchronous oscillation of the electronic power devices after acquiring electric energy fluctuations generated by the oscillation. Specifically, a subsynchronous component suppression method is provided according to the embodiment. As shown in FIG. 1, the method includes the following steps S11 to S13.

At S11, an electric energy fluctuation parameter generated by the subsynchronous oscillation of the power transmission system is acquired. Specifically, the subsynchronous oscillation causes an electric energy fluctuation in the grid, for example, a voltage fluctuation and a current fluctuation in the grid. Such a fluctuation may in turn cause power fluctuation. In this embodiment, a voltage fluctuation parameter in the grid may be acquired, and the current fluctuation parameter or power fluctuation parameter may be acquired. Specifically, magnitude, frequency, and the like of the electric energy fluctuation may be included in the acquired the electric energy fluctuation parameter.

At S12, a compensation parameter of a current setting for an active axis is acquired according to the electric energy fluctuation parameter. In a specific embodiment, the subsynchronous oscillation may be suppressed by strongly damping the fluctuation component after the electric energy fluctuation parameter is acquired. Specifically, since the power electronic device is controlled by a switching signal which is obtained by a series of controls on the current setting for the active axis and the actual current, the compensation parameter of the current setting for the active axis may be obtained according to the electric energy fluctuation parameter, so as to compensate the current setting for the active axis.

At S13, the converter is controlled to suppress the subsynchronous oscillation according to the compensation parameter of the current setting for the active axis. In a specific embodiment, an error current which is obtained by subtracting the actual active current from the active current setting after the active current setting is compensated, said error current flows through a current PI controller to add a coupling term on dq axis, so as to obtain a reference voltage. A Park transformation and an SVPWM computation are performed thereon to obtain a switching signal which is outputted to an inverter power module at the grid side to realize a closed-loop current adjustment. A controlling of electric energy fluctuation parameter may be added to controlling of the power electronic device, and the compensation parameter of the current setting for the active axis generated based on the electric energy fluctuation parameter may have the same magnitude and frequency as those of the subsynchronous oscillation component, and have a difference phase of 180° comparing with subsynchronous oscillation component. Such a fluctuation parameter can offset the influence of the subsynchronous component on the current setting for the active axis, such that the power electronic device can be controlled to suppress the subsynchronous oscillation.

Since the subsynchronous oscillation causes the electric energy fluctuation in the grid, such as the voltage fluctuation and the current fluctuation in the grid, which may in turn cause the power fluctuation, the subsynchronous oscillation may be suppressed by acquiring the electric energy fluctuation component in the grid and damping the fluctuation component according to this embodiment. Specifically, since the power electronic device is controlled by a switching signal which is obtained by a series of controls on the current setting for the active axis and the actual current, the compensation parameter of the current setting for the active axis may be obtained according to the electric energy fluctuation parameter. After the current setting for the active axis is compensated, the converter is controlled to suppress the subsynchronous oscillation.

Figure 3:
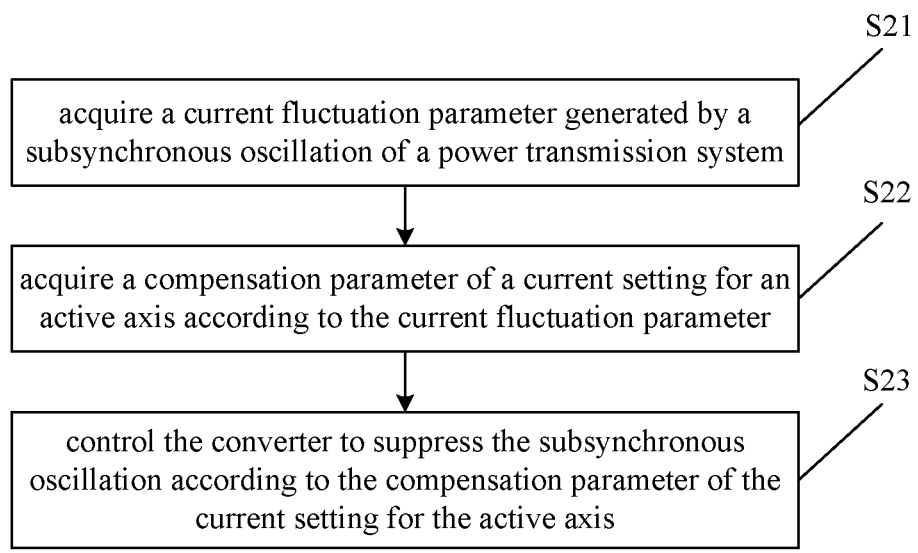
FIG. 3 is a schematic diagram showing a method for suppressing a subsynchronous oscillation according to another embodiment of the present disclosure.
Figure 4:
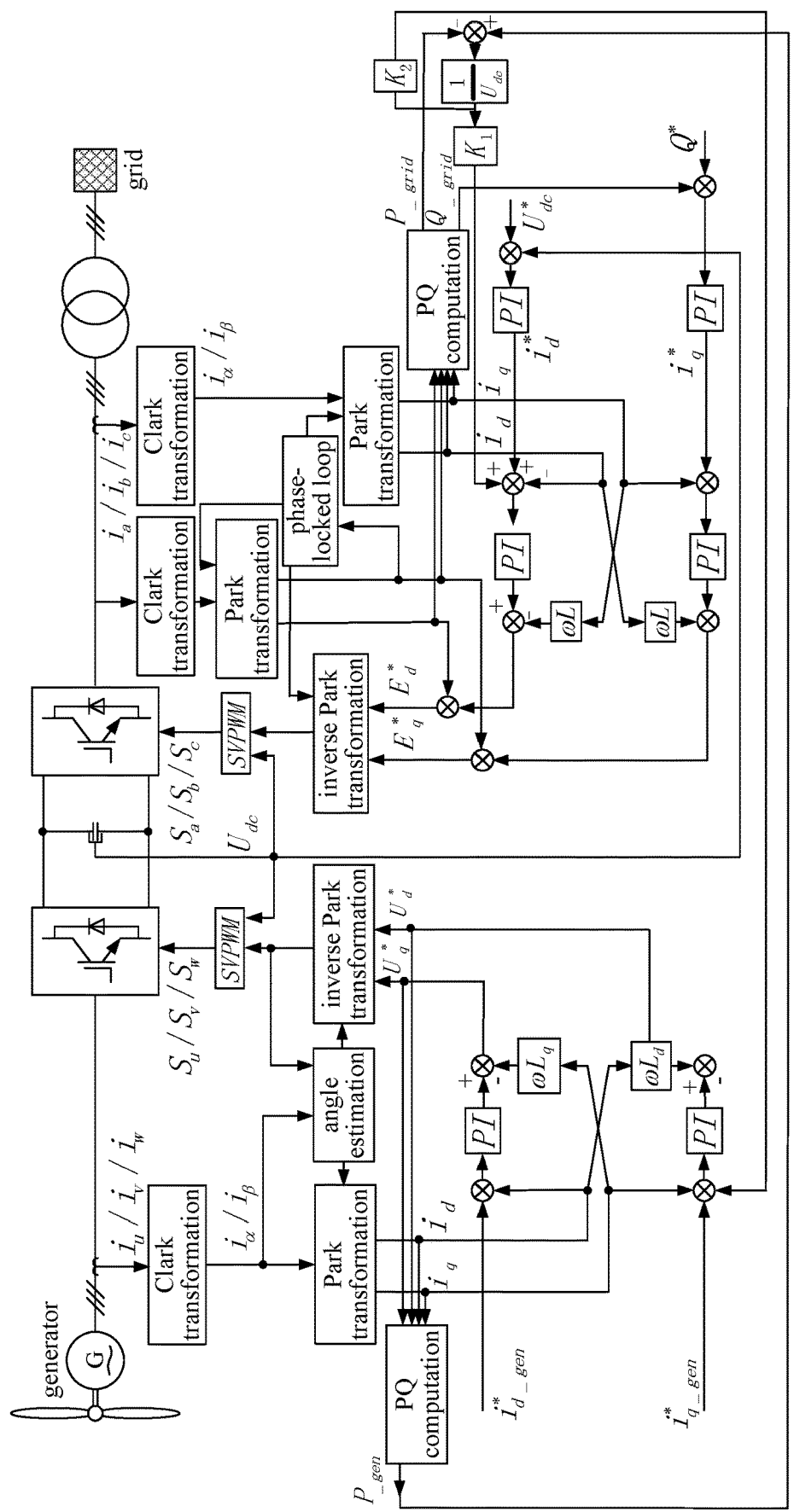
FIG. 4 is a block diagram showing a controlling of a converter in a subsynchronous oscillation suppression method according to an embodiment of the present disclosure.

Due to the influence of the subsynchronous oscillation on the current setting for the active axis, the current setting for the active axis should be compensated to eliminate the influence of the subsynchronous oscillation on the current setting for the active axis, so as to correct a control signal of the power electronic device, thereby suppressing the subsynchronous oscillation. Since the compensation is performed on the current setting for the active axis, the electric energy fluctuation parameter may be a current fluctuation parameter. The current setting for the active axis may be directly compensated after an active axis fluctuation parameter is obtained. Alternatively, the current setting for the active axis may be compensated by multiplying the current fluctuation parameter by a first preset coefficient according to the actual situation. A subsynchronous oscillation suppression method is further provided according to an embodiment of the present disclosure. As shown in FIG. 3 and FIG. 4, the method may include the following steps S21 to S23.

At S21, a current fluctuation parameter generated by the subsynchronous oscillation of the power transmission system is acquired. The subsynchronous oscillation has a greater influence on the grid side, and has less influence on the generator side, especially has less influence on the wind turbine, since the subsynchronous oscillation occurs at the grid side. Therefore, a fluctuation of an output power at the generator side may be neglected. When acquiring the electric energy fluctuation parameter generated by the subsynchronous oscillation of the power transmission system, a difference between an actual output power $P_{\_grid}$ at the grid side and a power setting value $P_{\_gen}$ at the generator side is calculated as a power fluctuation parameter generated by the subsynchronous oscillation after the actual output power P_grid at the grid side and the power setting value P_gen at the generator side are acquired respectively. An active power fluctuation parameter is calculated as follows. After the actual output power $P_{\_grid}$ at the grid side and the power setting value $P_{\_gen}$ at the generator side are respectively acquired, the difference between the actual output power P$_{\_grid}$ at the grid side and the power setting value P$_{\_gen}$ at the generator side is calculated, and said difference is the active power fluctuation parameter generated by the subsynchronous oscillation. Then, the current fluctuation parameter is obtained by dividing the active power fluctuation parameter by an active axis component E$_d$ of a voltage at the grid side or by an actual voltage value U$_{dc}$ component of a DC bus.

At S22, a compensation parameter of the current setting for the active axis is acquired according to the current fluctuation parameter. Details of this step may refer to the description of acquiring the compensation parameter of the current setting for the active axis in step S12 in the above embodiment.

At S23, the converter is controlled to suppress the subsynchronous oscillation according to the compensation parameter of the current setting for the active axis. Details of this step may refer to the description of controlling the converter to suppress the subsynchronous oscillation in step S13 in the above embodiment.

Since the subsynchronous oscillation is complicated, the compensation amount maybe insufficient by using the calculated current fluctuation parameter directly to compensate the current setting for the active axis, resulting in a poor suppression effect. In an alternative embodiment, the current fluctuation parameter may be magnified by K times, wherein a value of K may be any value from 1 to 5. The current setting for the active axis is compensated after the current fluctuation parameter is magnified by K times.

Since additional inertia may be provided by the generator side for the DC bus, in an alternative embodiment, a current setting for the active axis at the grid side and a current setting for the torque axis at the generator side may be simultaneously compensated, so that a more stable grid can be ensured. After the current fluctuation parameter is acquired, a compensation parameter of the current setting for the torque axis at the generator side may be acquired by multiplying the current fluctuation parameter by a second preset coefficient, that is, magnified by K1 times; and a compensation parameter of the current setting for the active axis at the grid side may be acquired by multiplying the current fluctuation parameter by a third preset coefficient, that is, magnified by K2 times. The value ranges of K1 and K2 may be any value ranges from 1 to 5, and the specific value may be determined according to actual conditions. In addition to utilizing the power electronic devices at the grid side to suppress the subsynchronous oscillation, electronic power devices at the generator side may be further utilized to stabilize the actual voltage value U$_{dc}$ of the DC bus and increase inertia at the DC bus, thereby providing an additional inertia link for the grid side which is in favor of a stable operation of the grid.

The electric energy fluctuation parameter may include a power fluctuation parameter. The subsynchronous oscillation has a greater influence on the grid side, and has less influence on the generator side, especially has less influence on the wind turbine, since the subsynchronous oscillation occurs at the grid side. Therefore, a fluctuation of an output power at the generator side may be neglected. When acquiring the electric energy fluctuation parameter generated by the subsynchronous oscillation of the power transmission system, a difference between an actual output power at the grid side and a power setting value at the generator side is calculated as a power fluctuation parameter generated by the subsynchronous oscillation after the actual output power P$_{\_grid}$ at the grid side and the power setting value P$_{\_gen}$ at the generator side are acquired respectively. The power fluctuation parameter may be acquired directly by making a subtraction between the output powers at the grid side and at the generator side. The active axis current fluctuation parameter at the grid side is obtained according to the power fluctuation parameter and an active axis component of a voltage at the grid side. After the power fluctuation parameter is obtained, active axis current fluctuation parameter at the grid side may also be obtained according to the power fluctuation parameter and the actual voltage value of the DC bus.

Figure 5:
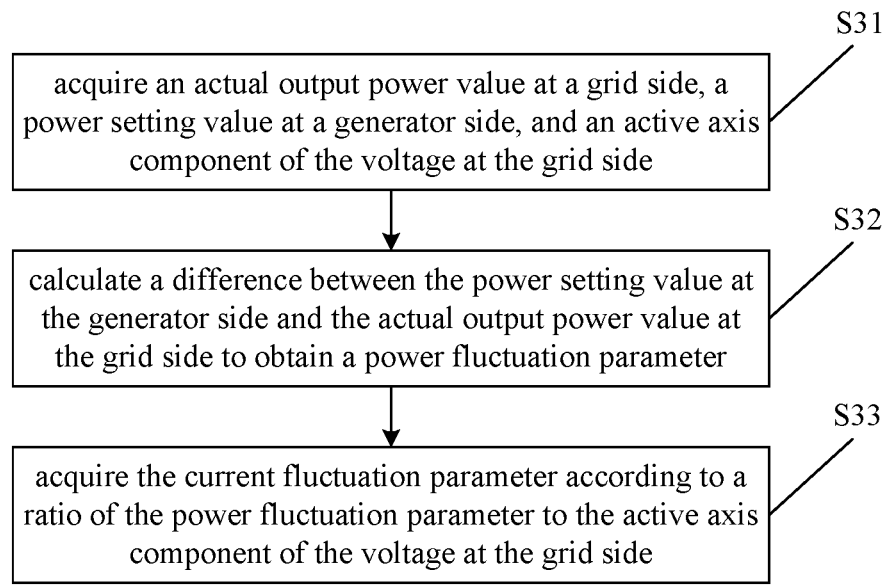
FIG. 5 is a schematic diagram of a method for acquiring an electric energy fluctuation parameter in a subsynchronous oscillation suppression method according to an embodiment of the present disclosure.
Figure 6:
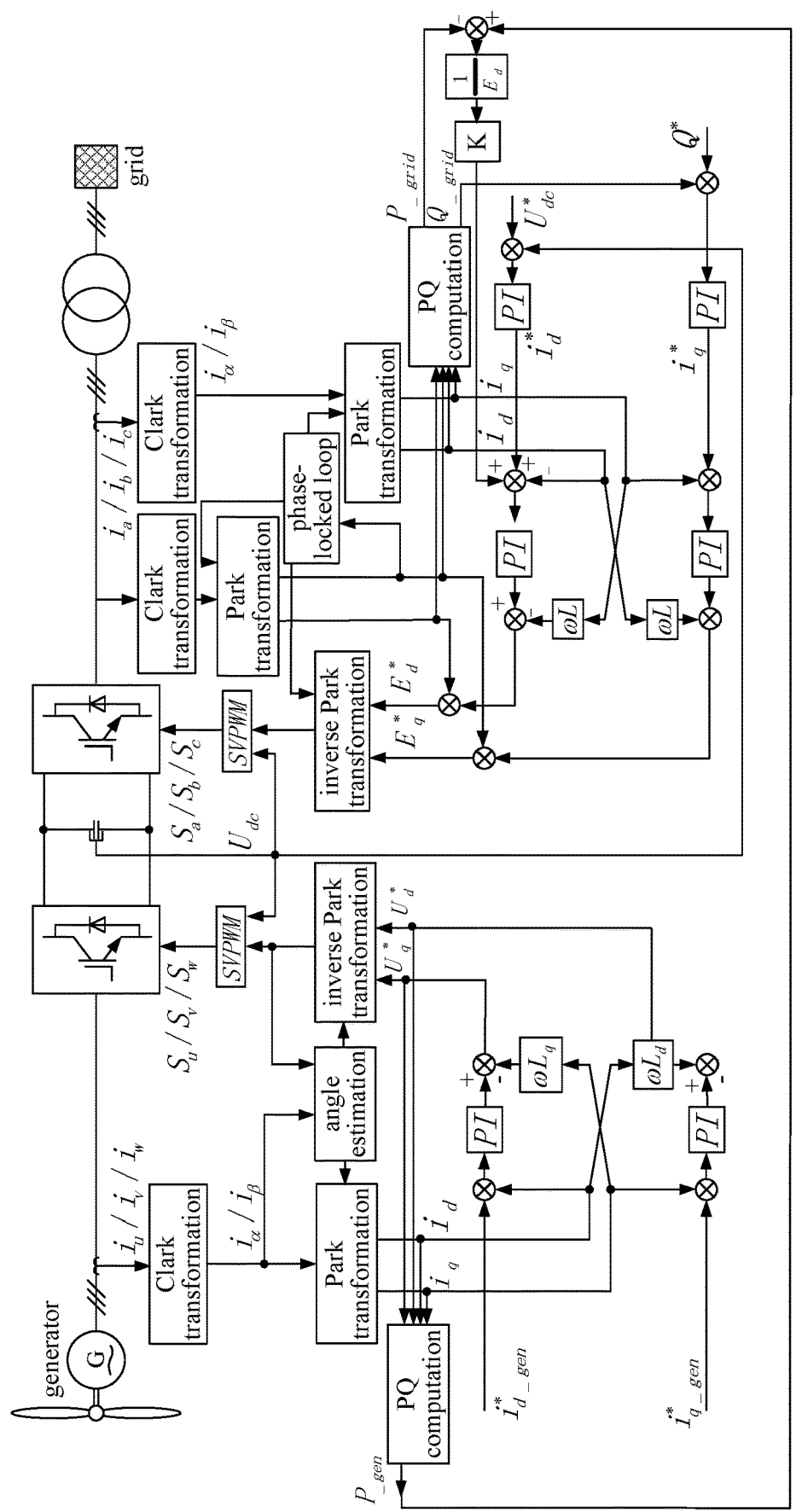
FIG. 6 is a block diagram showing a controlling of a converter in a subsynchronous oscillation suppression method according to another embodiment of the present disclosure.

Since the subsynchronous oscillation has influence on both of the grid side and the DC side, the current fluctuation parameter may be obtained from the grid side or from the DC bus. In the present embodiment, an example in which the current fluctuation parameter is acquired from the grid side is described. Specifically, as shown in FIG. 5 and FIG. 6, the acquiring the current fluctuation parameter may include the following steps S31 to S33.

At S31, an actual output power value at a grid side, a power setting value at a generator side and active axis component of a voltage at the grid side are acquired, respectively. In a specific embodiment, three-phase currents at the generator side may be transformed into currents in a αβ coordinate system through a Clark transformation, and then said currents are transformed into a torque current and a weak magnetic current on dq axis through Park. Error currents, which are obtained by subtracting an actual torque current and an actual magnetic current from torque current setting and weak magnetic current respectively, are processed by current PI controllers (Proportional integral) to add coupling terms for a dq axis, so as to obtain a reference voltage. An actual output active power at the generator side is obtained based on the torque current and the reference voltage. Three-phase currents at the grid side are transformed into currents in a αβ coordinate system through a Clark transformation, and then said currents are transformed into an active current and a reactive current on a dq axis through a Park transformation. Error currents, which are obtained by subtracting an actual active current and an actual reactive current from an active current setting and a reactive current setting respectively, are processed through current PI controllers (Proportional integral) to add coupling terms on dq axis, so as to obtain a reference voltage. The actual output active power at the grid side is obtained based on the active current and the reference voltage.

At S32, a difference between the power setting value at the generator side and the actual output power value at the grid side to obtain the power fluctuation parameter. In a specific embodiment, the subsynchronous oscillation has a greater influence on the grid side, and has less influence on the generator side, especially has less influence on the wind turbine, since the subsynchronous oscillation occurs at the grid side. Therefore, a fluctuation of an output power at the generator side may be neglected. The power fluctuation may be obtained directly by calculating a difference between an actual output power P$_{\_grid}$ at the grid side and a power setting value of the generator. In this embodiment, the power fluctuation may be an active power fluctuation.

At S33, the current fluctuation parameter is acquired according to the ratio of the power fluctuation parameter to the active axis component of the voltage at the grid side. In a specific embodiment, the current fluctuation parameter may be expressed by the following formula:

$$i = \frac{P_1}{E_d}$$

Where i denotes the current fluctuation parameter, P1 denotes the power fluctuation parameter, and $E_d$ is the active axis current fluctuation parameter at the grid side.

Figure 7:
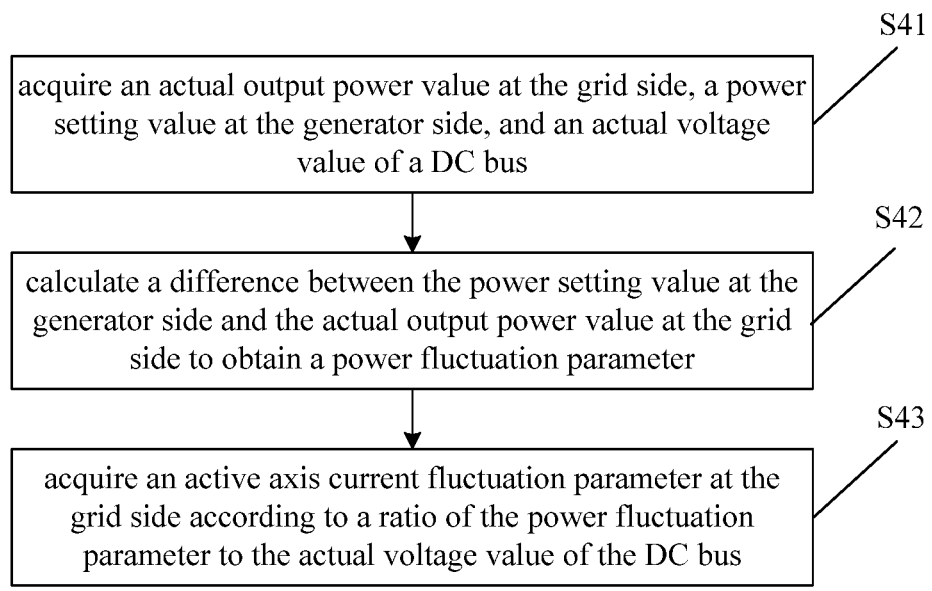
FIG. 7 is a schematic diagram of another method for acquiring an electric energy fluctuation parameter in a subsynchronous oscillation suppression method according to an embodiment of the present disclosure.
Figure 8:
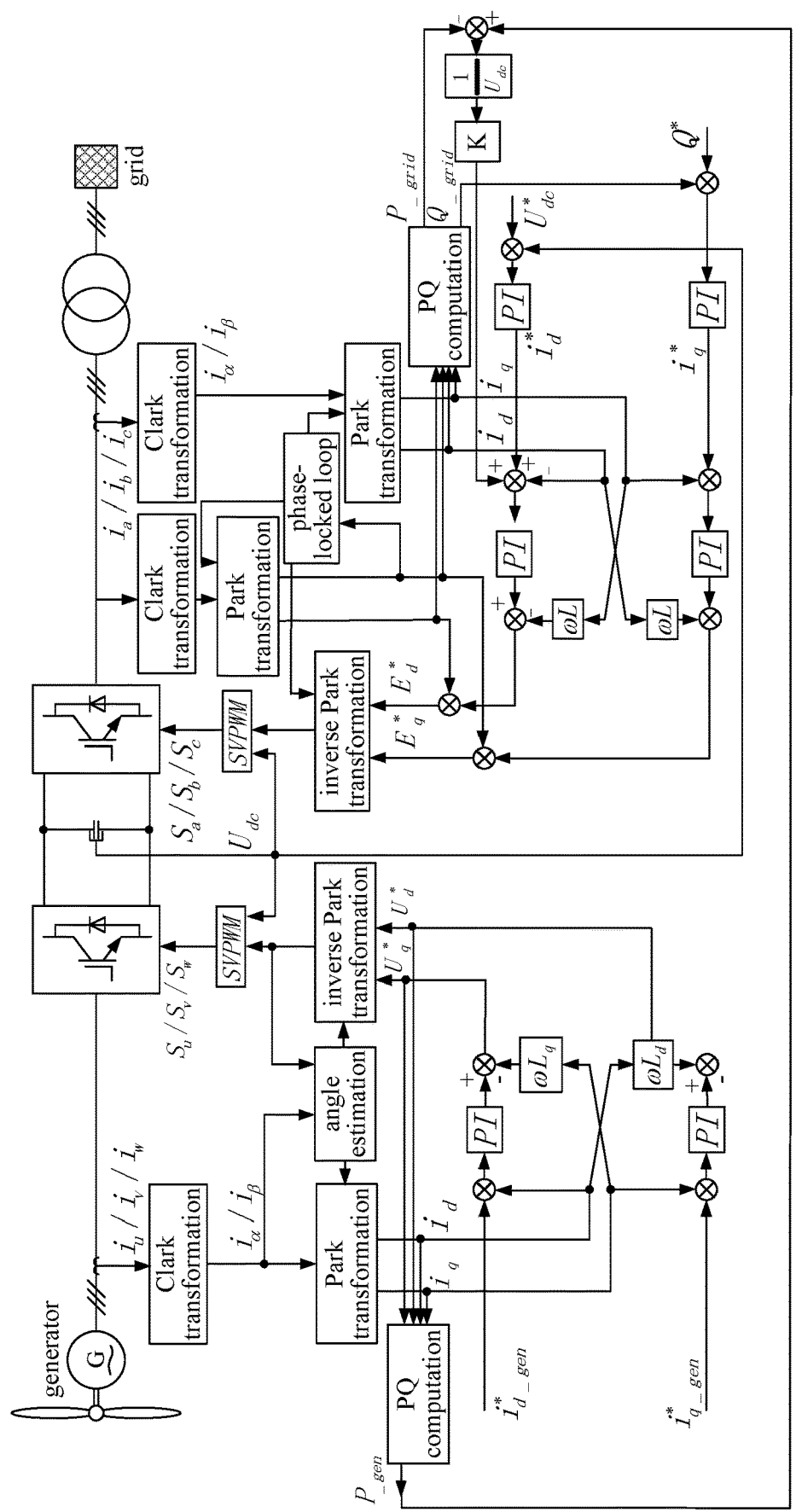
FIG. 8 is a block diagram showing a controlling of a converter in a subsynchronous oscillation suppression method according to another embodiment of the present disclosure.

Since the DC side may also be influenced by the subsynchronous oscillation, in an alternative embodiment, the active current fluctuation parameter may be obtained based on the power fluctuation parameter and the actual voltage value $U_{dc}$ of the DC bus. Specifically, as shown in FIG. 7 and FIG. 8, the method may include the following steps S41 to S43.

At S41, an actual output power value at a grid side, a power setting value at a generator side, and an actual voltage value of a DC bus are acquired respectively. Details of this step may refer to the description of obtaining an actual output power $P_{\_grid}$ at the grid side and a power setting value $P_{\_gen}$ at the generator side at step S31 in the above embodiment.

At S42, a difference between the power setting value at the generator side and the actual output power value at the grid side is calculated to obtain the power fluctuation parameter. Details of this step may refer to the description of calculating the power fluctuation parameter at S32 in the above embodiment.

At S43, an active axis current fluctuation parameter at the grid side is acquired according to the ratio of the power fluctuation parameter to the actual voltage value of the DC bus. Details of this step may refer to the description of calculating the current fluctuation parameter at S33 in the above embodiment.

Since a DC supporting capacitor are arranging in the DC side, the current flowing through the DC supporting capacitor is obtained actually, after the power at the generator side minus the power at the grid side and then the result is divided by the actual voltage value Udc of the DC bus. According to the relationship between capacitor voltage and current:

$$i_{cap\_dc} = -C \frac{dU_{dc}}{dt}$$

Where $i_{cap\_dc}$ denotes a current of the DC bus, C denotes a capacitance of the DC supporting capacitor of the DC bus, and $U_{dc}$ denotes an actual voltage value of the DC bus.

Figure 9:
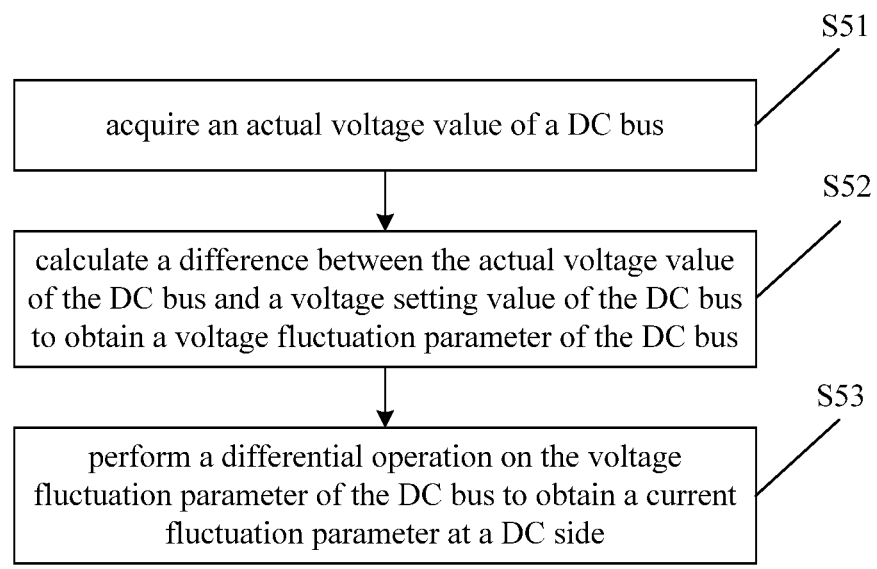
FIG. 9 is a schematic diagram of another method for acquiring an electric energy fluctuation parameter in a subsynchronous oscillation suppression method according to an embodiment of the present disclosure.
Figure 10:
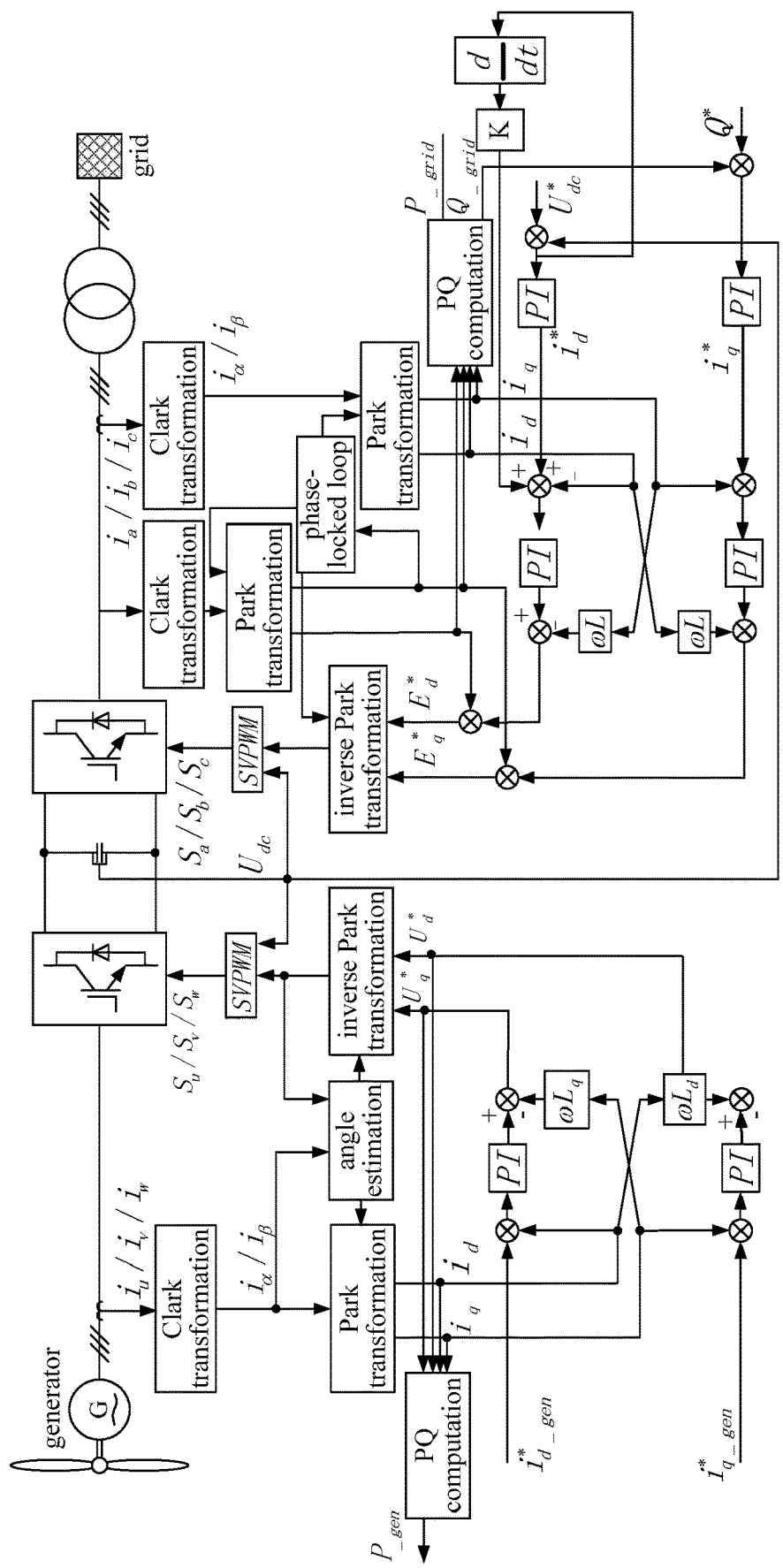
FIG. 10 is a block diagram showing a controlling of a converter in a subsynchronous oscillation suppression method according to another embodiment of the present disclosure.

The current flowing through the DC supporting capacitor is equivalent to the differential of the actual voltage value Udc of the DC bus. Since the subsynchronous oscillation occurring at the grid side may cause subsynchronous oscillation to occur at the DC side, the current setting for the active axis may be compensated according to a current fluctuation parameter at the DC side. Specifically, an oscillation at the DC side may be in a form of a difference that the actual voltage value of the DC bus is inconsistent with the voltage setting. Therefore, the actual voltage value of the DC bus may be obtained; a difference between the actual voltage value of the DC bus and the voltage setting value of the DC bus may be calculated to obtain a voltage fluctuation parameter of the DC bus. A differential operation is performed on the voltage fluctuation parameter of the DC bus to obtain the current fluctuation parameter at the DC side. Specifically, an oscillation at the DC side may be in a form of a difference that the actual voltage value of the DC bus is inconsistent with the voltage setting. In an alternative embodiment, the current fluctuation parameter may be calculated based on the output current at the DC side. Specifically, as shown in FIG. 9 and FIG. 10, the method may include the following steps S51 to S53.

At S51, an actual voltage value of a DC bus is acquired. In a specific embodiment, the actual voltage value $U_{dc}$ of the DC bus is an actual DC voltage Udc on the DC bus.

At S52, a difference between the actual voltage value of the DC bus and the voltage setting value of the DC bus is calculated to obtain a voltage fluctuation parameter of the DC bus. The oscillation at the DC side may be in a form of a difference that the actual voltage value of the DC bus is inconsistent with the voltage setting. Therefore, the voltage fluctuation parameter may be obtained by calculating the difference between the actual voltage value $U_{dc}$ of the DC bus and the voltage setting value Udc* of the DC bus.

At S53, a differential operation is performed on the voltage fluctuation parameter of the DC bus to obtain the current fluctuation parameter at the DC side.

Figure 11:
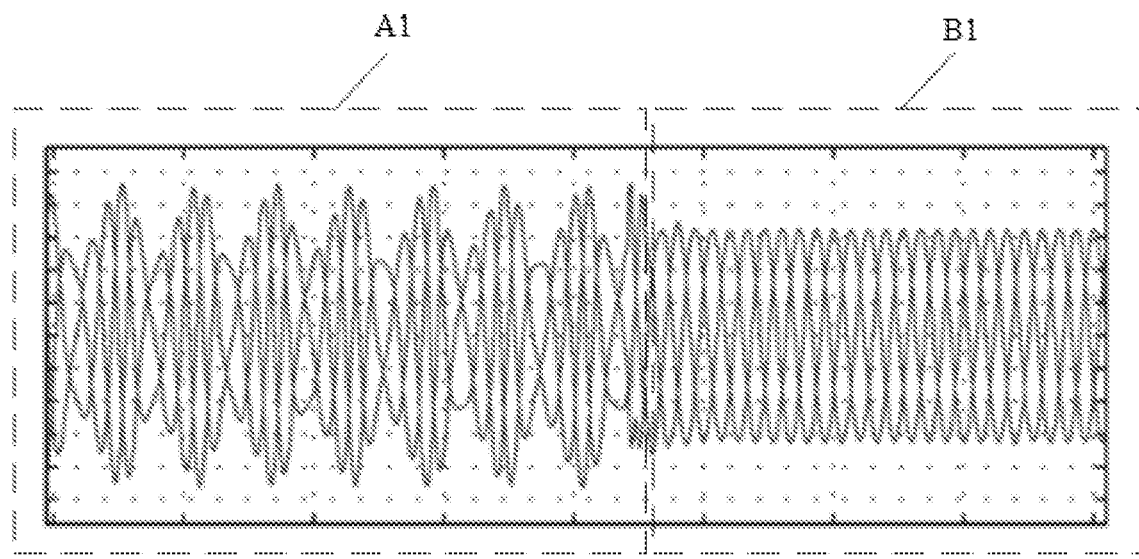
FIG. 11 is a simulation diagram showing a voltage suppression effect at a grid side in a subsynchronous oscillation according to an embodiment of the present disclosure.
Figure 12:
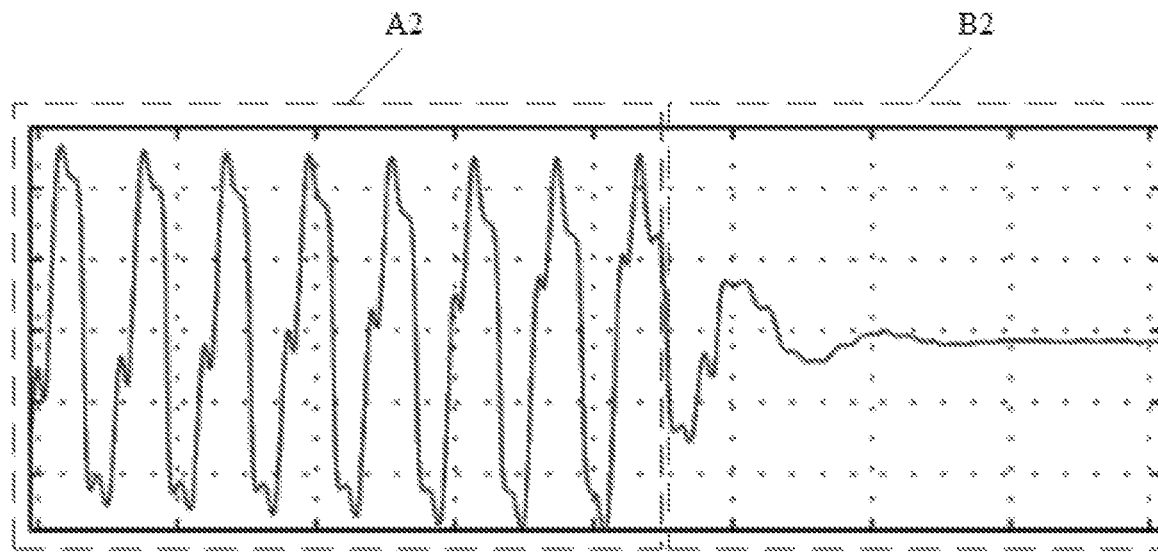
FIG. 12 is a simulation diagram showing an active power suppression effect at a grid side in a subsynchronous oscillation according to an embodiment of the present disclosure.
Figure 13:
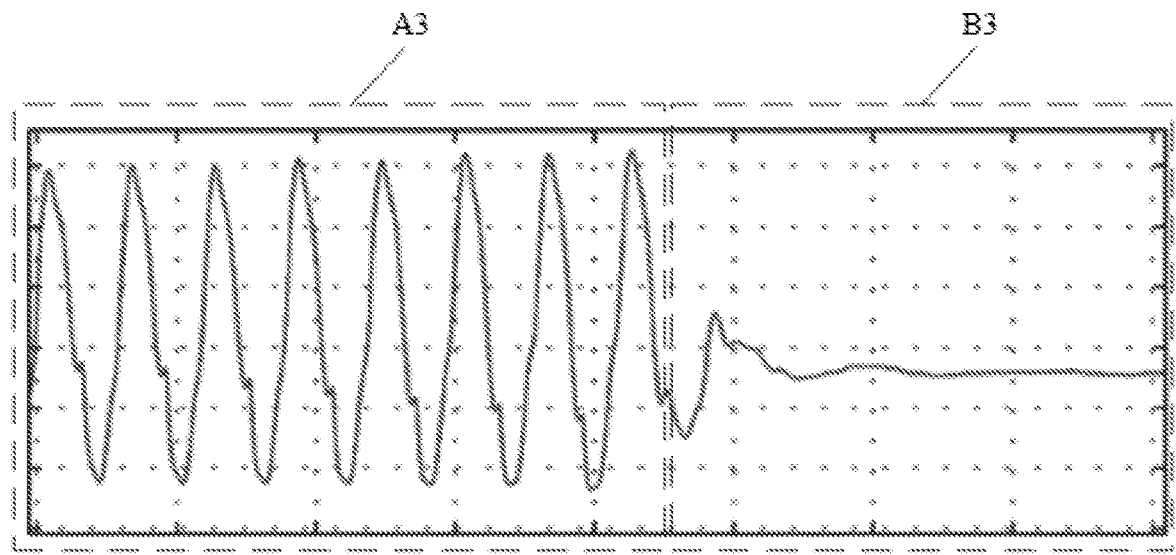
FIG. 13 is a simulation diagram showing a reactive power suppression effect at a grid side in a subsynchronous oscillation according to an embodiment of the present disclosure.

FIGS. 11-13 are simulation diagrams showing suppression effects of the subsynchronous oscillation suppression method according to the embodiment of the present disclosure. In FIG. 11, the area A1 shows a voltage waveform diagram at the grid side before implementing the subsynchronous oscillation suppression method according to the present embodiment, and the area B1 shows a voltage waveform diagram at the grid side after the implementing the subsynchronous oscillation suppression method according to the present embodiment. In FIG. 12, the area A2 shows an active power waveform diagram at the grid side before implementing the subsynchronous oscillation suppression method according to the present embodiment, and the area B2 shows an active power waveform diagram after the implementing the subsynchronous oscillation suppression method according to the present embodiment. In FIG. 13, the area A3 shows a reactive power waveform diagram at the grid side before implementing the subsynchronous oscillation suppression method according to the present embodiment, and the area B3 shows a reactive power waveform diagram after implementing the subsynchronous oscillation suppression method according to the present embodiment. It can be seen from the comparison result in FIGS. 11-13 that the subsynchronous oscillation suppression method according to the present embodiment can suppress the subsynchronous oscillation.

Figure 14:
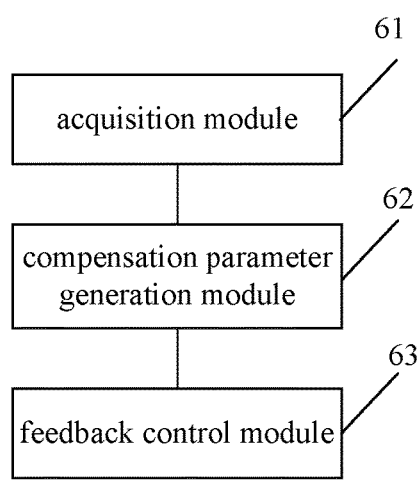
FIG. 14 is a schematic diagram showing a subsynchronous oscillation suppression device according to an embodiment of the present disclosure.

A subsynchronous oscillation suppression device for controlling a converter is further provided in an embodiment of the present disclosure. As shown in FIG. 14, the suppression device may include: an acquisition module 61, a compensation parameter generation module 62 and a feedback control module 63.

The acquisition module 61 is configured to acquire an electric energy fluctuation parameter generated by a subsynchronous oscillation of a power transmission system.

The compensation parameter generation module 62 is configured to generate a compensation parameter of a current setting for an active axis according to the electric energy fluctuation parameter.

The feedback control module 63 is configured to control the converter to suppress the subsynchronous oscillation according to the compensation parameter of the current setting for the active axis.

Since the subsynchronous oscillation causes the electric energy fluctuation in the grid, such as the voltage fluctuation and the current fluctuation in the grid, which may in turn cause the power fluctuation, the subsynchronous oscillation may be suppressed by acquiring the electric energy fluctuation component in the grid and damping the fluctuation component according to this embodiment. Specifically, since the power electronic device is controlled by a switching signal which is obtained by a series of controls on the current setting for the active axis and the actual current, the compensation parameter of the current setting for the active axis may be obtained according to the electric energy fluctuation parameter. After the current setting for the active axis is compensated, the converter is controlled to suppress the subsynchronous oscillation.

Since the compensation is performed on the current setting for the active axis, the electric energy fluctuation parameter may be a current fluctuation parameter. The current setting for the active axis may be directly compensated after an active axis fluctuation parameter is obtained. Alternatively, the current setting for the active axis may be compensated by multiplying the current fluctuation parameter by a first preset coefficient according to the actual situation.

In an alternative embodiment, the power fluctuation parameter is a current fluctuation parameter; the current setting for the active axis includes a current setting for an active axis at a grid side; the compensation parameter generation module includes: a first calculation unit, configured to multiply the current fluctuation parameter by a first preset coefficient to obtain the compensation parameter of the current setting for the active axis.

In an alternative embodiment, the current setting for the active axis includes a current setting for a torque axis at the generator side and a current setting for an active axis at the grid side. The compensation parameter generation module includes: a second calculation unit, configured to multiply the current fluctuation parameter by a second preset coefficient to obtain a compensation parameter of the current setting for the torque axis at the generator side; and a third calculation unit, configured to multiply the current fluctuation parameter by a third preset coefficient to obtain a compensation parameter of the current setting for the active axis at the grid side.

In an alternative embodiment, the current fluctuation parameter includes an active axis current fluctuation parameter at the grid side. The acquisition module includes a first acquisition unit, configured to acquire an actual output power value at the grid side, a power setting value at the generator side and an active axis component of a voltage at the grid side; a fourth calculation unit, configured to calculate a difference between the power setting value at the generator side and the actual output power value at the grid side to obtain a power fluctuation parameter; and a fifth calculation unit, configured to acquire the current fluctuation parameter according to a ratio of the power fluctuation parameter to the active axis component of the voltage at the grid side.

In an alternative embodiment, the current fluctuation parameter includes an active axis current fluctuation parameter at the grid side. The acquisition module includes a second acquisition unit, configured to acquire an actual output power value at the grid side, a power setting value at the generator side and an actual voltage value of a DC bus; a sixth calculation unit, configured to calculate a difference between the power setting value at the generator side and the actual output power value at the grid side to obtain a power fluctuation parameter; and a seventh calculation unit, configured to acquire the active axis current fluctuation parameter at the grid side according to a ratio of the power fluctuation parameter to the actual voltage value of the DC bus.

In an alternative embodiment, the current fluctuation parameter includes a current fluctuation parameter at the DC side. The acquisition module includes a third acquisition unit, configured to acquire an actual voltage value of a DC bus; an eighth calculation unit, configured to calculate a difference between the actual voltage value of the DC bus and a voltage setting value of the DC bus to obtain a voltage fluctuation parameter of the DC bus; and a ninth calculation unit, configured to perform a differential operation on the voltage fluctuation parameter of the DC bus to obtain the current fluctuation parameter at the DC side.

Since the subsynchronous oscillation causes the electric energy fluctuation in the grid, such as the voltage fluctuation and the current fluctuation in the grid, which may in turn cause the power fluctuation, the subsynchronous oscillation may be suppressed by acquiring the electric energy fluctuation component in the grid and damping the fluctuation component according to the present disclosure. Specifically, since the power electronic device is controlled by a switching signal which is obtained by a series of controls on the current setting for the active axis and the actual current, the compensation parameter of the current setting for the active axis may be obtained according to the electric energy fluctuation parameter. After the current setting for the active axis is compensated, the converter is controlled to suppress the subsynchronous oscillation.

A controller for a converter is further provided in an embodiment of the present disclosure, and the controller is provided with the subsynchronous oscillation suppression device described in the above embodiment. In particular, the converter may be a converter of a wind turbine.

It can be understood by those skilled in the art that all or part of the processes for implementing the above embodiments may be realized by a hardware associated with a computer program or instructions, and the related programs may be stored in a computer readable storage medium. The program, when executed, may include the process in an embodiment of the methods as described above. The storage medium may be a magnetic disk, an optical disk, a read-only memory (ROM), a random access memory (RAM), a flash memory, a hard disk drive (HDD) or a Solid-State Drive (SSD), and so on. The storage medium may also include a combination of the above memories.

Implementations of the present disclosure has been described in conjunction with the drawings, various modifications and variations may be made by those skilled in the art without departing from the spirit and scope of the present disclosure, and such modifications and variations fall within the scope as defined by the appended claims.

The invention claimed is:

1. A subsynchronous oscillation suppression method for controlling a converter, comprising:
    acquiring an electric energy fluctuation parameter generated by a subsynchronous oscillation of a power transmission system;
    acquiring a compensation parameter of a current setting for an active axis according to the electric energy fluctuation parameter; and
    controlling the converter to suppress the subsynchronous oscillation according to the compensation parameter of the current setting for the active axis,
    wherein the electric energy fluctuation parameter is a current fluctuation parameter, and the current setting for the active axis comprises a current setting for a torque axis at a generator side and a current setting for an active axis at a grid side;
    the acquiring a compensation parameter of a current setting for an active axis according to the electric energy fluctuation parameter comprises:

multiplying the current fluctuation parameter by a second preset coefficient to acquire a compensation parameter of the current setting for the torque axis at the generator side; and multiplying the current fluctuation parameter by a third preset coefficient to acquire a compensation parameter of the current setting for the active axis at the grid side.

2. The subsynchronous oscillation suppression method according to claim 1, wherein the electric energy fluctuation parameter is a current fluctuation parameter, and the current setting for the active axis comprises a current setting for an active axis at a grid side;

wherein the acquiring a compensation parameter of a current setting for an active axis according to the electric energy fluctuation parameter comprises:

multiplying the current fluctuation parameter by a first preset coefficient to acquire the compensation parameter of the current setting for the active axis.

3. The subsynchronous oscillation suppression method according to claim 2, wherein the current fluctuation parameter comprises an active axis current fluctuation parameter at the grid side;

wherein the acquiring an electric energy fluctuation parameter generated by a subsynchronous oscillation of a power transmission system comprises:

acquiring an actual output power value at the grid side, a power setting value at the generator side and an active axis component of a voltage at the grid side;

calculating a difference between the power setting value at the generator side and the actual output power value at the grid side to obtain a power fluctuation parameter; and acquiring the current fluctuation parameter according to a ratio of the power fluctuation parameter to the active axis component of the voltage at the grid side.

4. The subsynchronous oscillation suppression method according to claim 2, wherein the current fluctuation parameter comprises an active axis current fluctuation parameter at the grid side;

wherein the acquiring an electric energy fluctuation parameter generated by a subsynchronous oscillation of a power transmission system comprises:

acquiring an actual output power value at the grid side, a power setting value at the generator side and an actual voltage value of a DC bus;

calculating a difference between the power setting value at the generator side and the actual output power value at the grid side to obtain a power fluctuation parameter; and acquiring the active axis current fluctuation parameter at the grid side according to a ratio of the power fluctuation parameter to the actual voltage value of the DC bus.

5. The subsynchronous oscillation suppression method according to claim 2, wherein the current fluctuation parameter comprises a current fluctuation parameter at a DC side;

the acquiring an electric energy fluctuation parameter generated by a subsynchronous oscillation of a power transmission system comprises:

acquiring an actual voltage value of a DC bus;

calculating a difference between the actual voltage value of the DC bus and a voltage setting value of the DC bus to obtain a voltage fluctuation parameter of the DC bus; and performing a differential operation on the voltage fluctuation parameter of the DC bus to obtain the current fluctuation parameter at the DC side.

6. The subsynchronous oscillation suppression method according to claim 1, wherein the current fluctuation parameter comprises an active axis current fluctuation parameter at the grid side;

wherein the acquiring an electric energy fluctuation parameter generated by a subsynchronous oscillation of a power transmission system comprises:

acquiring an actual output power value at the grid side, a power setting value at the generator side and an active axis component of a voltage at the grid side;

calculating a difference between the power setting value at the generator side and the actual output power value at the grid side to obtain a power fluctuation parameter; and acquiring the current fluctuation parameter according to a ratio of the power fluctuation parameter to the active axis component of the voltage at the grid side.

7. The subsynchronous oscillation suppression method according to claim 1, wherein the current fluctuation parameter comprises an active axis current fluctuation parameter at the grid side;

wherein the acquiring an electric energy fluctuation parameter generated by a subsynchronous oscillation of a power transmission system comprises:

acquiring an actual output power value at the grid side, a power setting value at the generator side and an actual voltage value of a DC bus;

calculating a difference between the power setting value at the generator side and the actual output power value at the grid side to obtain a power fluctuation parameter; and acquiring the active axis current fluctuation parameter at the grid side according to a ratio of the power fluctuation parameter to the actual voltage value of the DC bus.

8. The subsynchronous oscillation suppression method according to claim 1, wherein the current fluctuation parameter comprises a current fluctuation parameter at a DC side;

the acquiring an electric energy fluctuation parameter generated by a subsynchronous oscillation of a power transmission system comprises:

acquiring an actual voltage value of a DC bus;

calculating a difference between the actual voltage value of the DC bus and a voltage setting value of the DC bus to obtain a voltage fluctuation parameter of the DC bus; and performing a differential operation on the voltage fluctuation parameter of the DC bus to obtain the current fluctuation parameter at the DC side.

9. A subsynchronous oscillation suppression device for controlling a converter, comprising a computer processing unit, and a memory, the memory storing instruction executed by the computer processing unit, which cause the computer process unit to:

an acquisition module, configured to acquire an electric energy fluctuation parameter generated by a subsynchronous oscillation of a power transmission system;

a compensation parameter generation module, configured to generate a compensation parameter of a current setting for an active axis according to the electric energy fluctuation parameter; and a feedback control module, configured to control the converter to suppress the subsynchronous oscillation according to the compensation parameter of the current setting for the active axis;

wherein the electric energy fluctuation parameter is a current fluctuation parameter; the current setting for the active axis comprises a current setting for an active axis at a grid side, wherein the compensation parameter generation module comprises:

a first calculation unit, configured to multiply the current fluctuation parameter by a first preset coefficient to obtain the compensation parameter of the current setting for the active axis;

wherein the current setting for the active axis comprises a current setting for a torque axis at a generator side and the current setting for the active axis at the grid side;

wherein the compensation parameter generation module comprises:

a second calculation unit, configured to multiply the current fluctuation parameter by a second preset coefficient to obtain a compensation parameter of the current setting for the torque axis at the generator side; and a third calculation unit, configured to multiply the current fluctuation parameter by a third preset coefficient to obtain a compensation parameter of the current setting for the active axis at the grid side.

10. The subsynchronous oscillation suppression device according to claim 9, wherein the current fluctuation parameter comprises: an active axis current fluctuation parameter at the grid side;

wherein the acquisition module comprises:

a first acquisition unit, configured to acquire an actual output power value at the grid side, a power setting value at the generator side and an active axis component of a voltage at the grid side;

a fourth calculation unit, configured to calculate a difference between the power setting value at the generator side and the actual output power value at the grid side to obtain a power fluctuation parameter; and a fifth calculation unit, configured to acquire the current fluctuation parameter according to a ratio of the power fluctuation parameter to the active axis component of the voltage at the grid side.

11. The subsynchronous oscillation suppression device according to claim 9, wherein the current fluctuation parameter comprises an active axis current fluctuation parameter at the grid side;

wherein the acquisition module comprises:

a second acquisition unit, configured to acquire an actual output power value at the grid side, a power setting value at the generator side and an actual voltage value of a DC bus;

a sixth calculation unit, configured to calculate a difference between the power setting value at the generator side and the actual output power value at the grid side to obtain a power fluctuation parameter; and a seventh calculation unit, configured to acquire the active axis current fluctuation parameter at the grid side according to a ratio of the power fluctuation parameter to the actual voltage value of the DC bus.

12. The subsynchronous oscillation suppression device according to claim 9, wherein the current fluctuation parameter comprises a current fluctuation parameter at a DC side;

wherein the acquisition module comprises:

a third acquisition unit, configured to acquire an actual voltage value of a DC bus;

an eighth calculation unit, configured to calculate a difference between the actual voltage value of the DC bus and a voltage setting value of the DC bus to obtain a voltage fluctuation parameter of the DC bus; and a ninth calculation unit, configured to perform a differential operation on the voltage fluctuation parameter of the DC bus to obtain the current fluctuation parameter at the DC side.

13. A controller for the converter, wherein the controller is provided with the subsynchronous oscillation suppression device according to claim 9.

14. The controller for a converter according to claim 13, wherein the converter is a converter for a wind turbine.

15. The subsynchronous oscillation suppression device according to claim 9, wherein the current fluctuation parameter comprises: an active axis current fluctuation parameter at the grid side;

wherein the acquisition module comprises:

a first acquisition unit, configured to acquire an actual output power value at the grid side, a power setting value at the generator side and an active axis component of a voltage at the grid side;

a fourth calculation unit, configured to calculate a difference between the power setting value at the generator side and the actual output power value at the grid side to obtain a power fluctuation parameter; and a fifth calculation unit, configured to acquire the current fluctuation parameter according to a ratio of the power fluctuation parameter to the active axis component of the voltage at the grid side.

16. The subsynchronous oscillation suppression device according to claim 9, wherein the current fluctuation parameter comprises an active axis current fluctuation parameter at the grid side;

wherein the acquisition module comprises:

a second acquisition unit, configured to acquire an actual output power value at the grid side, a power setting value at the generator side and an actual voltage value of a DC bus;

a sixth calculation unit, configured to calculate a difference between the power setting value at the generator side and the actual output power value at the grid side to obtain a power fluctuation parameter; and a seventh calculation unit, configured to acquire the active axis current fluctuation parameter at the grid side according to a ratio of the power fluctuation parameter to the actual voltage value of the DC bus.

17. The subsynchronous oscillation suppression device according to claim 9, wherein the current fluctuation parameter comprises a current fluctuation parameter at a DC side;

wherein the acquisition module comprises:

a third acquisition unit, configured to acquire an actual voltage value of a DC bus;

an eighth calculation unit, configured to calculate a difference between the actual voltage value of the DC bus and a voltage setting value of the DC bus to obtain a voltage fluctuation parameter of the DC bus; and a ninth calculation unit, configured to perform a differential operation on the voltage fluctuation parameter of the DC bus to obtain the current fluctuation parameter at the DC side.

* * * * *